(12) United States Patent
Keeney-Ritchie et al.

(10) Patent No.: US 10,996,092 B2
(45) Date of Patent: May 4, 2021

(54) METHOD AND APPARATUS FOR MODULATING A FLOWPATH

(71) Applicant: Micro Motion, Inc., Boulder, CO (US)

(72) Inventors: Miles Keeney-Ritchie, Boulder, CO (US); Asher James Clinger, Boulder, CO (US); Nicole M. Brush, Fort Collins, CO (US); Martin Andrew Schlosser, Boulder, CO (US); Robert Ferris, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 109 days.

(21) Appl. No.: 16/068,851

(22) PCT Filed: Feb. 9, 2016

(86) PCT No.: PCT/US2016/017081
§ 371 (c)(1),
(2) Date: Jul. 9, 2018

(87) PCT Pub. No.: WO2017/138918
PCT Pub. Date: Aug. 17, 2017

(65) Prior Publication Data
US 2019/0017854 A1    Jan. 17, 2019

(51) Int. Cl.
*G01F 1/22* (2006.01)
*G01F 1/84* (2006.01)
*G01F 15/00* (2006.01)
*G01F 7/00* (2006.01)
*F16K 7/04* (2006.01)
*F16K 7/07* (2006.01)
*G05D 7/03* (2006.01)

(52) U.S. Cl.
CPC ........... *G01F 1/8463* (2013.01); *F16K 7/045* (2013.01); *F16K 7/07* (2013.01); *G01F 1/8409* (2013.01); *G01F 7/00* (2013.01); *G01F 7/005* (2013.01); *G01F 15/005* (2013.01); *G05D 7/03* (2013.01)

(58) Field of Classification Search
CPC ........ G01F 1/8463; G01F 1/8409; G01F 7/00; G01F 7/005; G01F 15/005; G05D 7/03; F16K 7/045; F16K 7/07
USPC ............................................... 137/486; 251/4
See application file for complete search history.

(56) References Cited

U.S. PATENT DOCUMENTS

| | | | | |
|---|---|---|---|---|
| 2,627,874 | A * | 2/1953 | Johnson | F16K 7/07 251/5 |
| 2,641,282 | A * | 6/1953 | Hazlett | F16K 7/07 251/5 |
| 2,925,251 | A * | 2/1960 | Arps | E21B 47/12 175/39 |
| 3,292,718 | A | 12/1966 | Stone | |
| 3,441,245 | A * | 4/1969 | Barnsley | F16K 7/07 251/5 |

(Continued)

FOREIGN PATENT DOCUMENTS

| | | |
|---|---|---|
| KR | 20150003131 U | 8/2015 |
| WO | 2008111983 A1 | 9/2008 |

*Primary Examiner* — Minh Q Le
(74) *Attorney, Agent, or Firm* — The Ollila Law Group LLC

(57) ABSTRACT

A flowmeter (5) is provided having a sensor assembly (10) connected to meter electronics (20), wherein the sensor assembly (10) comprises at least one driver (104) and at least one pickoff (105) and a variably modulated conduit (300) configured to change a flow area (304) therein.

30 Claims, 12 Drawing Sheets

(56) References Cited

U.S. PATENT DOCUMENTS

| | | | | |
|---|---|---|---|---|
| 3,479,002 | A * | 11/1969 | Hirs | F16K 7/07 251/5 |
| 3,885,769 | A | 5/1975 | Morrison | |
| 4,048,846 | A * | 9/1977 | Catherall | G01L 9/0008 73/579 |
| 4,092,010 | A * | 5/1978 | Carlson, Jr. | F16K 7/06 138/45 |
| 4,096,211 | A | 6/1978 | Rameau | |
| 4,108,418 | A * | 8/1978 | Ensign | F16K 7/07 137/375 |
| 4,442,954 | A * | 4/1984 | Bergandy | F16K 7/045 137/488 |
| 4,511,116 | A * | 4/1985 | Jackson | F16K 7/07 137/85 |
| 4,783,045 | A | 11/1988 | Tartaglino | |
| 4,884,441 | A * | 12/1989 | Lew | G01F 1/10 73/195 |
| 4,934,786 | A | 6/1990 | Krauter | |
| 5,316,261 | A * | 5/1994 | Stoner | G01F 1/40 138/45 |
| 5,423,225 | A * | 6/1995 | Cage | G01F 1/8409 73/861.18 |
| 5,448,921 | A | 9/1995 | Cage et al. | |
| 5,661,232 | A * | 8/1997 | Van Cleve | G01N 11/04 73/54.05 |
| 5,731,527 | A * | 3/1998 | Van Cleve | G01F 1/8477 138/172 |
| 5,753,827 | A * | 5/1998 | Cage | G01F 1/8409 73/32 A |
| 5,814,739 | A * | 9/1998 | Van Cleve | G01F 1/8409 73/861.357 |
| 5,945,609 | A * | 8/1999 | Kashimura | G01F 1/8409 73/861.357 |
| 6,450,042 | B1 * | 9/2002 | Lanham | B29C 33/52 73/861.357 |
| 7,424,376 | B2 * | 9/2008 | Carpenter | G01F 1/8413 702/50 |
| 7,891,589 | B2 * | 2/2011 | Reichler | F16L 55/134 239/692 |
| 2001/0013245 | A1 * | 8/2001 | Hanashiro | G01F 1/44 73/23.31 |
| 2003/0097884 | A1 | 5/2003 | Sund et al. | |
| 2004/0242956 | A1 * | 12/2004 | Scorvo | A61F 2/0022 600/30 |
| 2005/0092944 | A1 * | 5/2005 | Patterson | F16K 7/08 251/4 |
| 2012/0036926 | A1 | 2/2012 | Veeck et al. | |
| 2013/0255815 | A1 * | 10/2013 | Brinkmann | F16L 55/02727 138/46 |
| 2017/0205373 | A1 * | 7/2017 | Cage | G01N 29/02 |
| 2018/0245698 | A1 * | 8/2018 | Musolf | G05D 16/2097 |

\* cited by examiner

METHOD AND APPARATUS FOR MODULATING A FLOWPATH

TECHNICAL FIELD

The present invention relates to flowmeters, and more particularly, to a method and apparatus for modulating the area of a flow path.

BACKGROUND OF THE INVENTION

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. No. 4,109,524, U.S. Pat. No. 4,491,025, and Re. 31,450. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or with a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet end leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Often, flowmeters are used in applications that require extremely large turn downs and/or low pressure drops across the flowmeter. In hydrocarbon fluid applications, for example, flow rates may widely vary, yet pressure loss through the flowmeter must remain low to prevent lighter hydrocarbons from changing state. In order to measure low fluid flow accurately and yet handle high flow rates without heavy pressure loss, typically multiple flowmeters of various sizes are utilized in parallel, and flow rates are controlled by choosing the appropriate flowmeter, given the process conditions. This approach is expensive and complicated, as multiple flowmeters are required, installation is complex, and required maintenance and operating expenses are increased. In some applications where parallel meter schemes are not practical, such as wind-tunnel experiment operations, it is extremely cumbersome to re-pipe and re-size flowmeters in order to accommodate differing experimental conditions.

Therefore, there is a need in the art for a method and related apparatus to measure a wide range of flow rates in a single flowmeter. There is a need for a method and related apparatus to maintain a minimum fluid velocity such that accurate flow measurements may be acquired for a wide range of flow rates in a single flowmeter. The present invention overcomes these and other problems by providing a method and related apparatus for a flowmeter having a variable conduit cross-section, thus an advance in the art is achieved.

SUMMARY OF THE INVENTION

A flowmeter having a sensor assembly connected to meter electronics is provided according to an embodiment. The sensor assembly comprises at least one driver and at least one pickoff, comprising a variably modulated conduit configured to change a flow area therein.

A method of adjusting flow through a flowmeter conduit is provided according to an embodiment. The method comprises the steps of providing a sensor assembly and providing a variably modulated conduit in the sensor assembly configured to change a flow area therein and being adjustable to maintain a desired fluid velocity of fluid flowing therein.

ASPECTS

According to an aspect, a flowmeter has a sensor assembly connected to meter electronics. The sensor assembly comprises at least one driver and at least one pickoff, comprising a variably modulated conduit configured to change a flow area therein.

Preferably, the flow area is adjustable to maintain a desired fluid velocity of fluid flowing therein.

Preferably, the fluid velocity is maintained at a rate that maintains a desired delta t.

Preferably, the flowmeter comprises a first pressure sensor for measuring a first fluid pressure in the sensor assembly, a second pressure sensor for measuring a second fluid pressure in the sensor assembly, and wherein the flow area is adjustable to maintain a desired differential pressure between the first and second pressure sensors.

Preferably, the variably modulated conduit comprises a fluid-actuated bladder disposed in the flow area, wherein the fluid-actuated bladder comprises an adjustable cross-sectional area.

Preferably, the flowmeter comprises at least one support configured to suspend the bladder within the conduit.

Preferably, the variably modulated conduit comprises a plurality of fluid-actuated bladders disposed in the flow area, wherein the plurality of fluid-actuated bladders are configured to adjust in size to displace fluid flow within the flow area.

Preferably, the plurality of fluid-actuated bladders are disposed approximately equidistantly along an inner diameter of the conduit.

Preferably, the variably modulated conduit comprises a coiled bladder disposed in the flow area, wherein the coiled bladder comprises an adjustable cross-sectional area.

Preferably, the fluid-actuated bladder, plurality of fluid-actuated bladders, or coiled bladder comprises a compliant material configured to expand and contract.

Preferably, the fluid-actuated bladder, plurality of fluid-actuated bladders, or coiled bladder receives a fluid in a space therein.

Preferably, a resilient inner membrane is disposed inside the coils of the coiled bladder and defining the flow area.

Preferably, the variably modulated conduit comprises a plurality of leaves slidingly engaged to each other to form an adjustable flow area.

Preferably, an expandable membrane is disposed proximate the plurality of leaves to provide a fluid-tight seal.

Preferably, the plurality of leaves is actuatable with a clamp member to adjust the diameter of the plurality of leaves.

Preferably, the variably modulated conduit comprises a stretchable membrane comprising a helically woven net of fibers, wherein the helically woven net of fibers defines the flow area.

Preferably, the woven net of fibers is actuatable to adjust the diameter of the flow area.

Preferably, the flowmeter comprises a static pressure conduit disposed in the variably modulated conduit, wherein the static pressure conduit comprises a first end open to the fluid, and a second end sealed to itself, configured to allow a static pressure to be measured therein and a pressure differential ($\Delta P$) generally to be measured between the static pressure conduit and the flow area.

Preferably, the static pressure conduit comprises a compliant material that may deform as a pressure therein increases.

Preferably the variably modulated conduit comprises a plurality of conduit walls pivotable about a plurality of hinged joints, and wherein the static pressure conduit is configured to contact the plurality of conduit walls and modulate the flow area by pivoting the plurality of conduit walls about the plurality of hinged joints.

Preferably the static pressure conduit is configured to increase in size until a static pressure therein and a dynamic pressure in the flow area reaches equilibrium.

According to an aspect, a method of adjusting flow through a flowmeter conduit comprising the steps of providing a sensor assembly and providing a variably modulated conduit in the sensor assembly configured to change a flow area therein and being adjustable to maintain a desired fluid velocity of fluid flowing therein.

Preferably, the method comprises the step of maintaining a fluid velocity at a rate that maintains a desired delta t.

Preferably, the method comprises the steps of: measuring a first fluid pressure in the sensor assembly; measuring a second fluid pressure in the sensor assembly; and adjusting flow area to maintain a desired differential pressure between the first and second fluid pressures.

Preferably, the method comprises the step of actuating at least one fluid-actuated bladder disposed in the flow area, wherein the at least one fluid-actuated bladder comprises an adjustable cross-sectional area.

Preferably, the method comprises the step of actuating at least one of a plurality of leaves disposed in the flow area to slidingly engage upon each other so to define an adjustable cross-sectional area.

Preferably, the method comprises the steps of: providing a static pressure conduit disposed in the variably modulated conduit, comprising a first end open to the fluid, and a second end sealed to itself; measuring a static pressure in the static pressure conduit; measuring a dynamic pressure in the flow area; and calculating a pressure differential ($\Delta P$) between the static pressure conduit and the flow area.

Preferably, the static pressure conduit comprises a compliant material that may deform as a pressure therein increases.

Preferably, the method comprises the steps of: providing a plurality of conduit walls pivotable about a plurality of hinged joints; and modulating the flow area by pivoting the plurality of conduit walls about the plurality of hinged joints.

Preferably, the method comprises the steps of: placing the plurality of conduit walls in contact with the static pressure conduit; adjusting a size of the static pressure conduit due to a static pressure therein; and ceasing to adjust the size of the static pressure conduit when an equilibrium between a dynamic pressure in the flow area and a static pressure in the static pressure conduit is reached.

Preferably, the method comprises the steps of: determining the flow area of the variably modulated conduit; and determining a flow rate of fluid flowing through the variably modulated conduit.

DETAILED DESCRIPTION OF THE INVENTION

FIGS. 1-11 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
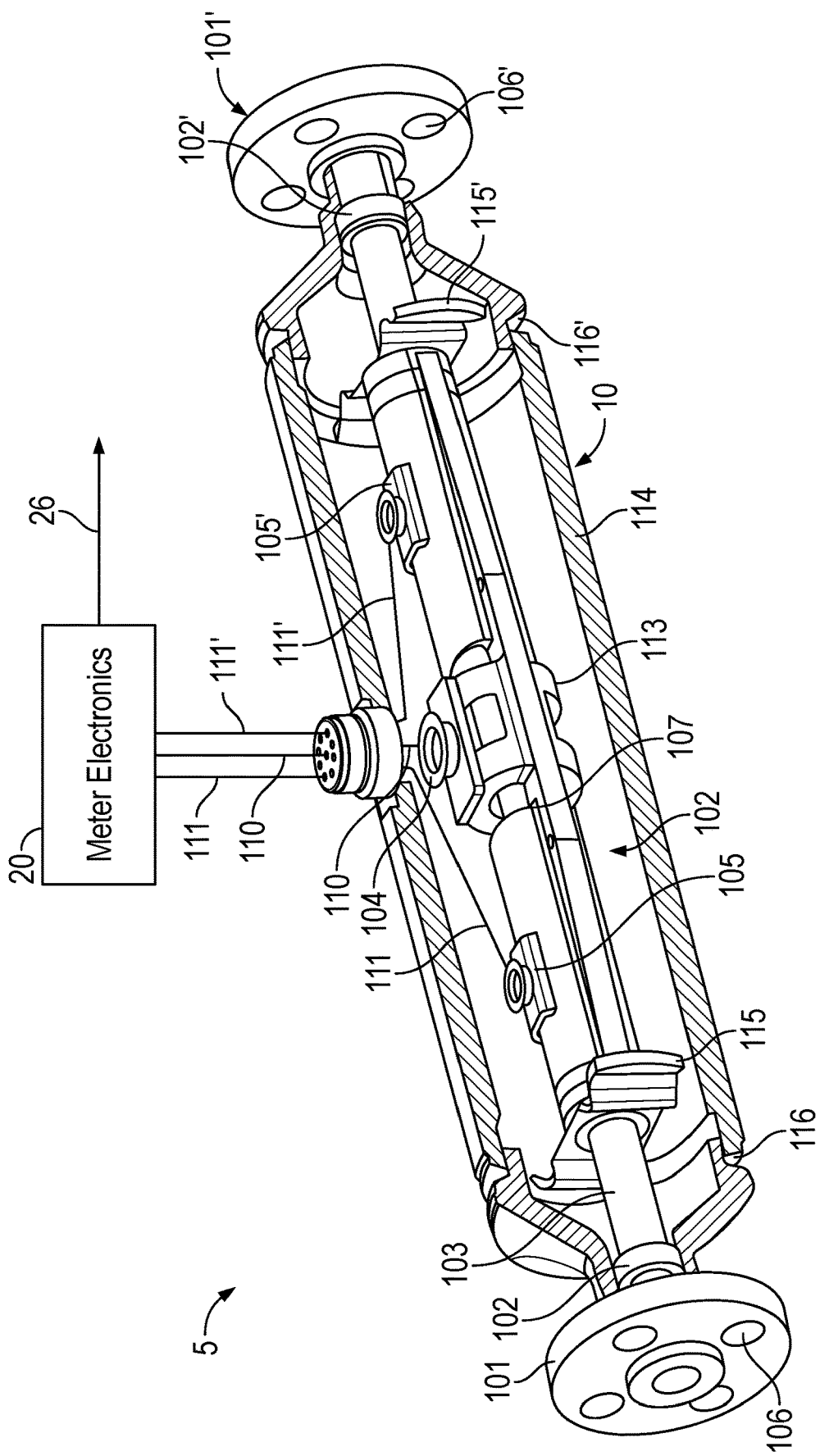
FIG. 1 shows a prior art vibrating sensor assembly.

FIG. 1 illustrates an example of a flowmeter 5 in the form of a Coriolis flowmeter comprising a sensor assembly 10 and one or more meter electronics 20. The one or more meter electronics 20 are connected to the sensor assembly 10 to measure a characteristic of a flowing material, such as, for example, density, mass flow rate, volume flow rate, totalized mass flow, temperature, and other information.

The sensor assembly 10 includes a pair of flanges 101 and 101' and a conduit 103. Flanges 101 and 101' of the present example are affixed to spacers 102 and 102'. Spacers 102 and 102' of the present example are affixed to opposite ends of conduit 103. The spacers 102 and 102' maintain the spacing between flanges 101 and 101' and the conduit 103 in the present example to prevent undesired vibrations in the conduits 103. The conduit 103 extends outwardly from the flanges 101, 101'. When the sensor assembly 10 is inserted into a pipeline system (not shown) which carries a flowing material, the material enters sensor assembly 10 through flange 101, passes into conduit 103, where it exits the sensor assembly 10 through the flange 101'. The flanges 101, 101' may have mounting holes 106, 106' configured to receive a fastener for purposes of installation to the pipeline system. The conduit 103 may, in an embodiment, be affixed to a case 114 via brace bars 115, 115'. In another embodiment, the brace bars 115, 115' are independent of the conduit 103, and may be used to support structures associated with the sensor assembly 10.

The sensor assembly 10 includes a driver 104. The driver 104 is affixed to conduit 103 in a position where the driver 104 can vibrate the conduit 103 in a drive mode. More particularly, the driver 104 includes a first driver component (not shown) affixed to conduit 103 and a second driver component affixed to a structure other than the conduit 103. The driver 104 may comprise one of many well-known arrangements, such as a magnet mounted to the conduit 103 and an opposing coil mounted to a mounting bracket 113, for example. The case 114 may have end caps 116, 116' attached thereto.

In the present example, the drive mode is the first out of phase bending mode and the conduit 103 is selected and appropriately mounted to flanges 101 and 101' so as to provide a balanced system having a relatively predictable and/or constant mass distribution, moment of inertia, and elastic modulus about a longitudinal bending axis. In the present example, where the drive mode is the first out of phase bending mode, the conduit 103 is driven by the driver 104. A drive signal in the form of an alternating current can be provided by one or more meter electronics 20, such as for example via pathway 110, and passed through a driver coil to cause conduit 103 to oscillate. Those of ordinary skill in the art will appreciate that other drive modes may be used within the scope of the present embodiments.

The sensor assembly 10 shown includes a pair of pickoffs 105, 105' that are affixed to conduit 103. More particularly, a first pickoff component (not shown) is located on conduit 103 and a second pickoff component is located on a structure independent of the conduit 103. In the embodiment depicted, the pickoffs 105, 105' may be electromagnetic detectors, for example—pickoff magnets and pickoff coils that produce pickoff signals that represent the velocity and position of the conduit 103. For example, the pickoffs 105, 105' may supply pickoff signals to the one or more meter electronics 20 via pathways 111, 111'. Those of ordinary skill in the art will appreciate that the motion of the conduit 103 is proportional to certain characteristics of the flowing material, for example, the mass flow rate and density of the material flowing through the conduits 103.

It should be appreciated that while the sensor assembly 10 described above comprises a single conduit flowmeter, it is well within the scope of the present embodiments to implement a multi-conduit flowmeter. Furthermore, while the flow conduit 103 is shown as comprising a straight flow conduit configuration, the present embodiments may be implemented with a flowmeter comprising a curved/bent flow conduit configuration. It should also be appreciated that the pickoffs 105, 105' can comprise strain gages, optical sensors, laser sensors, or any other sensor type known in the art. Therefore, the particular embodiment of the sensor assembly 10 described above is merely one example and should in no way limit the scope of the present embodiments.

In the example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, and other information. More particularly, the one or more meter electronics 20 receives one or more signals, for example, from pickoffs 105, 105' and, in an embodiment, one or more temperature sensors 107, such as a resistive temperature device (RTD), and use this information to measure a characteristic of a flowing material.

The techniques by which vibrating sensor assemblies, such as for example, Coriolis flowmeters or densitometers measure a characteristic of a flowing material are well understood; therefore, a detailed discussion is omitted for brevity of this description. As a brief overview, however, the density of an unknown fluid flowing through an oscillating conduit is proportional to the square of the period at which the tube resonates. In U.S. Pat. No. 4,491,009, a circuit is described that computes density through use of two serially connected integrators. A reference voltage is applied to the first integrator. Inasmuch as the spring constant of the conduit varies with temperature and thereby changes the resonant frequency, the reference voltage is appropriately compensated for temperature variations of the tube. Both integrators operate for a period of time equivalent to the square of the resonant period. In this manner, the output signal generated by the analog circuit provides a product of a temperature-dependent function and the square of the value of the resonant period. With appropriate scaling of the reference voltage, the output analog signal provides a direct readout of the density measurements (in specific gravity units) of the unknown fluid that flows through the conduit. It should be noted that this is merely one example of a prior art density measurement made with a vibratory meter, and in no way serves to limit the scope of the present embodiments.

Figure 2:
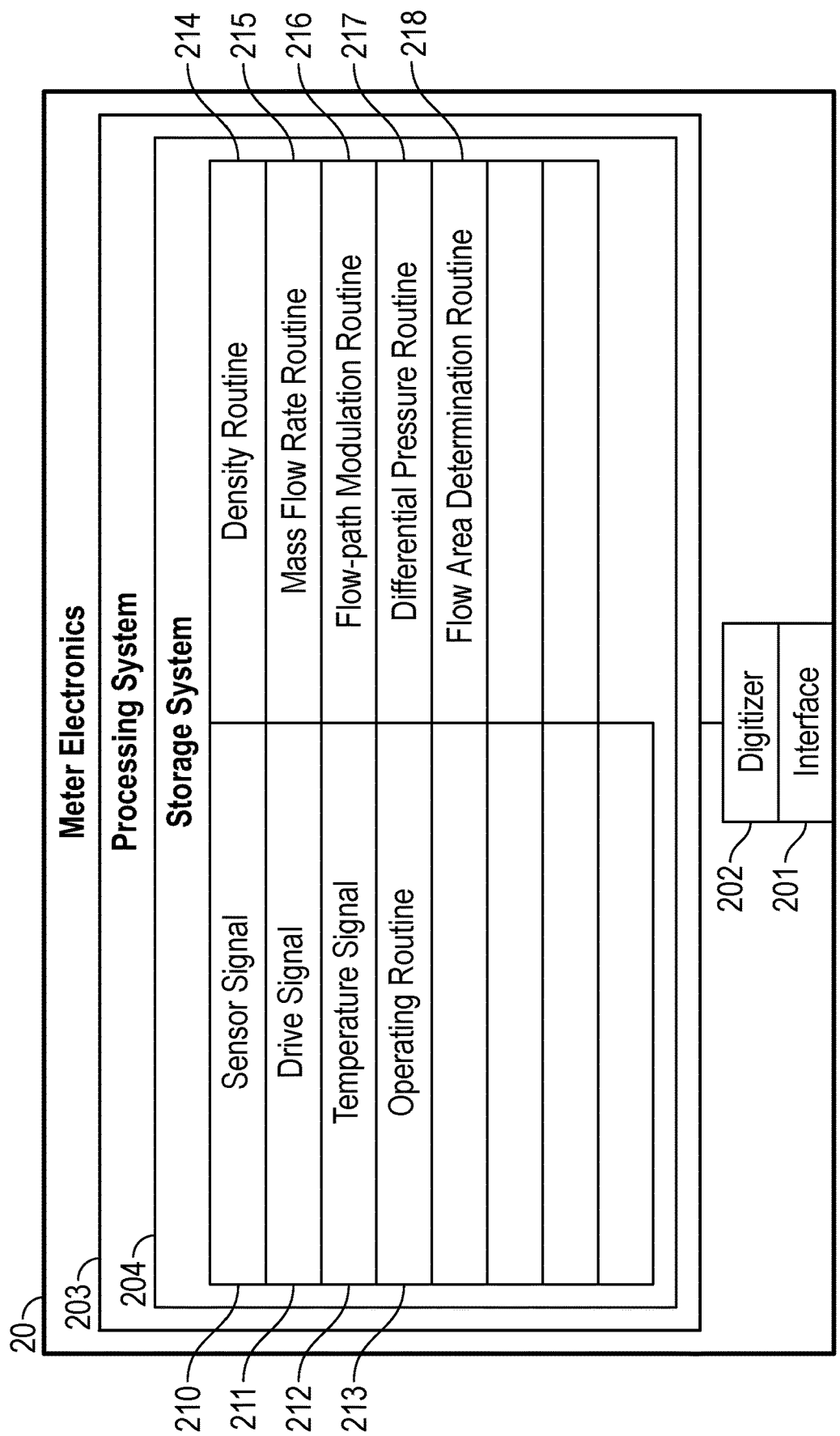
FIG. 2 shows meter electronics according to an embodiment.

FIG. 2 illustrates the meter electronics 20 according to an embodiment. The meter electronics 20 can include an interface 201 and a processing system 203. The processing system 203 may include a storage system 204. The storage system 204 may comprise an internal memory, and/or may comprise an external memory. The meter electronics 20 can generate a drive signal 211 and supply the drive signal to the driver 104 via pathway 110. In addition, the meter electronics 20 can receive sensor signals 210 from the sensor assembly 10 such as pickoff/velocity sensor signals, strain signals, optical signals, temperature signals, or any other signals known in the art. The meter electronics 20 can operate as a densitometer or can operate as a mass flowmeter, including operating as a Coriolis flowmeter. It should be appreciated that the meter electronics 20 may also operate as some other type of vibrating sensor assembly and the particular examples provided should not limit the scope of the present embodiments. The meter electronics 20 can process the sensor signals 210 in order to obtain flow characteristics of the material flowing through the flow conduit 103. In some embodiments, the meter electronics 20 may receive a temperature signal 212 from one or more RTD sensors or other temperature sensors 107, for example.

The interface 201 can receive the sensor signals from the driver 104 or pickoffs 105, 105', via pathways 110, 111, 111', respectively. The interface 201 may perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment can include a digitizer 202, wherein the sensor signal comprises an analog sensor signal. The digitizer 202 can sample and digitize the analog sensor signal and produce a digital sensor signal. The digitizer 202 can also perform any needed decimation, wherein the digital sensor signal is decimated in order to reduce the amount of signal processing needed and to reduce the processing time.

The processing system 203 can conduct operations of the meter electronics 20 and process flow measurements from the sensor assembly 10. The processing system 203 can execute one or more processing routines, such as the operating routine 213, density routine 214, mass flow rate routine 215, flow-path modulation routine 216, differential pressure routine 217, and flow area determination routine 218 for example without limitation, and thereby process the flow measurements in order to produce one or more flow measurements that are ultimately used to operate the flowmeter 5, perform desired functions, and any other related calculations.

The processing system 203 can comprise a general purpose computer, a micro-processing system, a logic circuit, or some other general purpose or customized processing device. The processing system 203 can be distributed among multiple processing devices. The processing system 203 can include any manner of integral or independent electronic storage medium, such as the storage system 204.

The processing system 203 processes the sensor signal 210 in order to generate the drive signal 211, among other things. The drive signal 211 is supplied to the driver 104 in order to vibrate the associated conduit(s), such as the conduit 103 of FIG. 1.

It should be understood that the meter electronics 20 may include various other components and functions that are generally known in the art. These additional features are omitted from the description and the figures for the purpose of brevity. Therefore, the present embodiments should not be limited to the specific embodiments shown and discussed.

According to an embodiment, the meter electronics 20 can be configured to measure flow through the flowmeter 5 as part of a mass flow rate routine 215. According to an embodiment, the meter electronics 20 can also measure a temperature signal 212, and adjust the calculated flow rates based on the measured temperature.

As an example of a flow-path modulation routine 216, the area of a conduit 103, or structures within or without the conduit 103, are modulated to adjust the fluid flow within the senor assembly 10, as will be more fully described below. In short, meter electronics 20 may, in an embodiment, aid in mediating modulation of a flow area of the sensor assembly 10. This allows measurement of low fluid flows accurately, and yet handles high flow rates without heavy pressure loss. In conjunction with modulating the flow path, the flow area determination routine 218, stores a determined area of a conduit 103, which may be utilized to calculate mass flow, density flow, and other flowmeter 5 values.

As an example of a differential pressure routine 217, pressure is measured at different points in the sensor assembly 10, as will be more fully described below. In short, fluid pressure (dynamic) is measured in an area of the conduit 103 where fluid may flow, and fluid pressure (static) is measured in an area associated with the conduit where fluid flow is restricted. These pressures may be compared with each other to calculate a differential pressure. In a flowmeter 5 experiencing fluid flow, the potential energy is provided by the static pressure, and the kinetic term is a function of fluid velocity and is represented by the dynamic pressure:

$$P_{Dynamic} = 1/2\rho V^2 \tag{1}$$

Since the total energy must remain constant, the static pressure decreases when the fluid velocity increases.

Figure 3A:
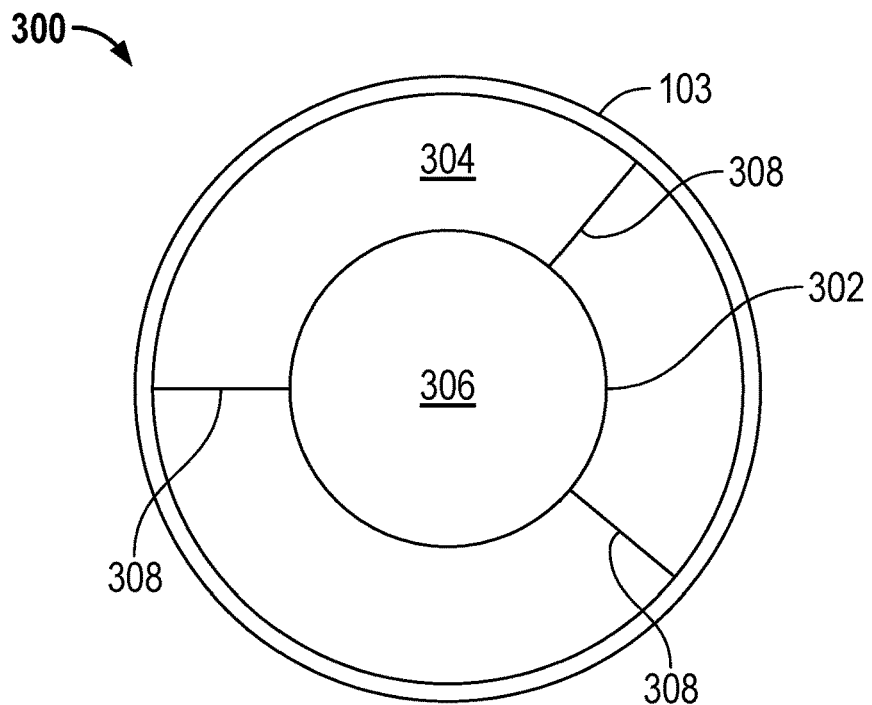
FIGS. 3A and 3B show a variably modulated conduit having a bladder according to an embodiment.
Figure 3B:
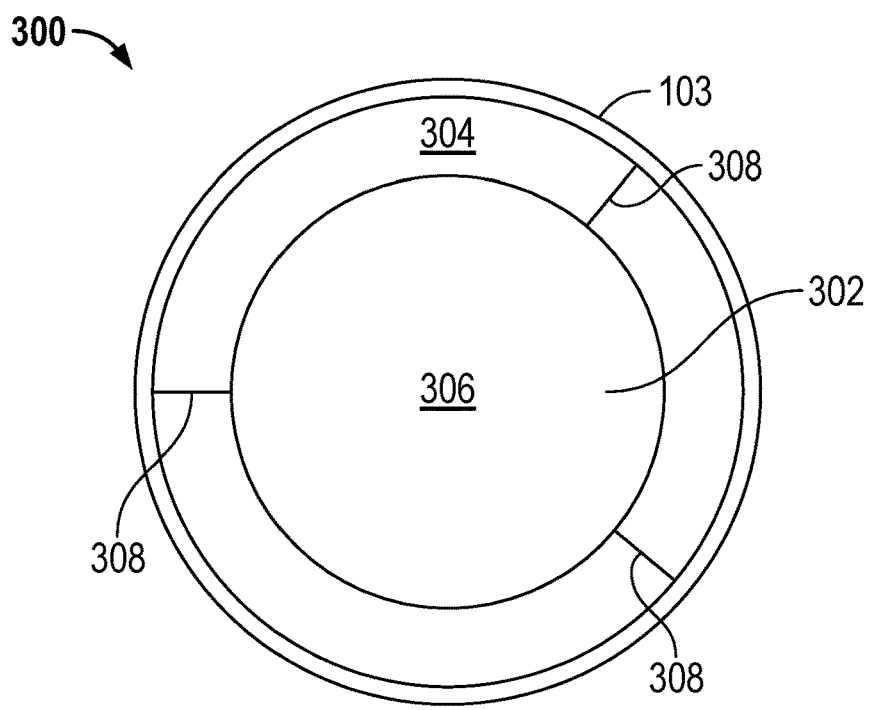

Turning to FIGS. 3A and 3B, an embodiment of a variably modulated conduit 300 is provided. This embodiment optimizes the flow area of the conduit 103. For example, the flow-path modulation routine 216 may optimize the flow signal by targeting a large delta t. This is accomplished by constricting the flow area of the conduit 103 to maintain enough fluid velocity to create the desired delta t. In another embodiment, the pressure drop across the meter is optimized. This may be done directly using an external differential pressure measurement or by targeting the minimum fluid velocity needed to confidently calculate delta t. FIG. 3A illustrates a cross-section of the variably modulated conduit 300 having a fluid-actuated bladder 302. The fluid-actuated bladder 302 may be pneumatic or hydraulic, and is configured to increase or decrease in cross-sectional area, depending on the pressure of the fluid in a space 306 therein. The bladder 302 is therefore made of a compliant material capable of expanding and contracting. In this embodiment, a relatively large conduit 103 is used to contain the flow in a flow area 304 within the conduit 103. The bladder 302 is disposed in approximately the center of the flow area 304, and displaces fluid flow, effectively expanding to reduce the flow area 304 or contracting to increase the flow area 304. For example, the process fluid in the flow area 304 may have fluid velocity increased by reducing the area of the flow area 304 when the bladder 302 is increased in size, so to optimize the delta t. This is reflected in FIG. 3B. In a related example, as shown in FIG. 3A, the process fluid in the flow area 304 may have fluid velocity decreased by increasing the area of the flow area 304 by decreasing the size of the bladder 302, so to optimize the delta t. This approach is advantageous because the process fluid remains easily coupled to the conduit. In an embodiment, at least one support 308 is provided to suspend the bladder 302 within the conduit 103. Three supports 308 are illustrated, but more or less than three supports 308 are contemplated. The supports is/are made of a compliant material and/or may be formed as a biasing member, such that the bladder 302 is maintained substantially along the centerline of the flow area 304, no matter the state of fluid-actuation. Fluid may be supplied to the bladder 302 by a pump, cylinder, or any fluid management system known in the art.

Figure 4A:
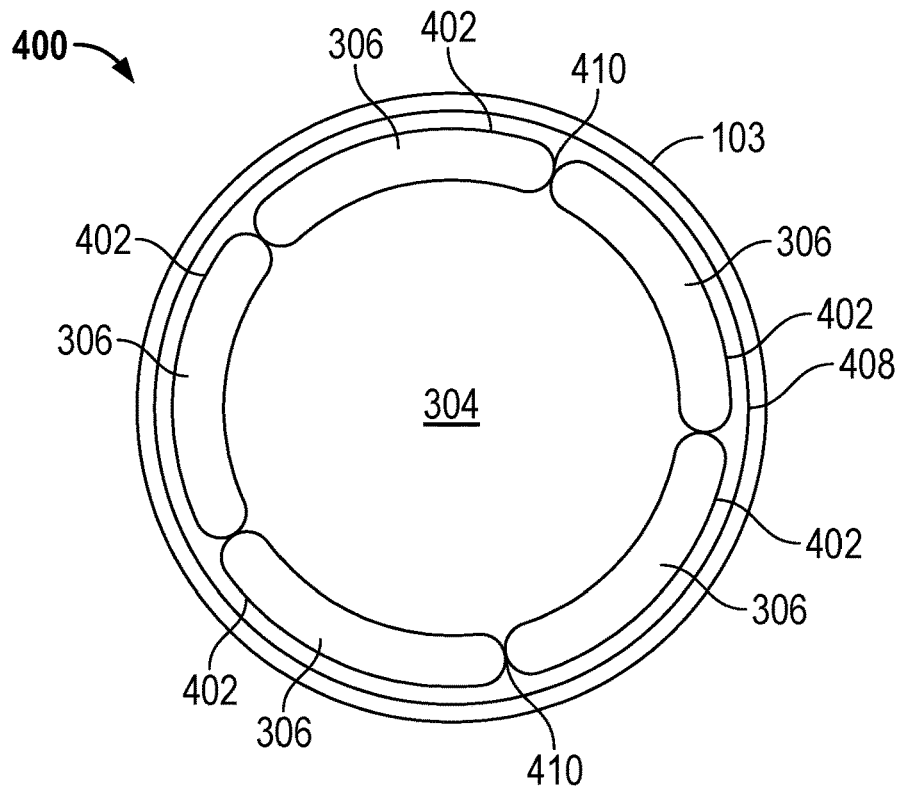
FIGS. 4A and 4B show a variably modulated conduit having a bladder according to another embodiment.
Figure 4B:
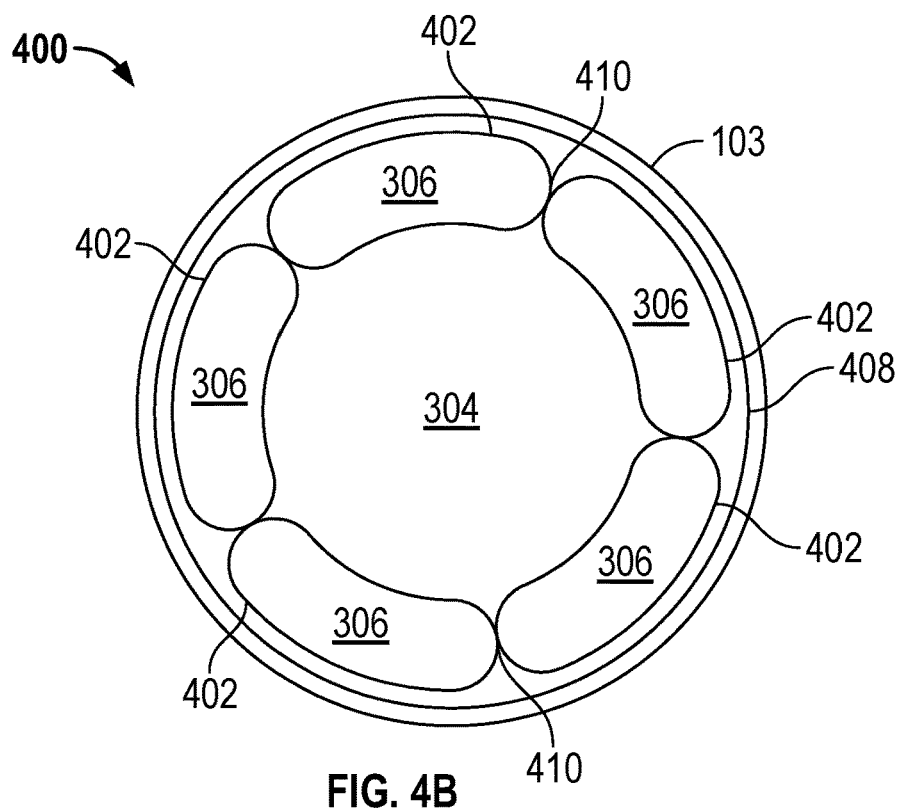

Turning to FIGS. 4A and 4B, an embodiment of a variably modulated conduit 400 is provided. This embodiment optimizes the flow area of the conduit 103. This is accomplished by constricting the flow area conduit 103 so to maintain enough fluid velocity to create the desired delta t. In another embodiment, the pressure drop across the meter is optimized. This may be done directly using an external differential pressure measurement or by targeting the minimum fluid velocity needed to confidently calculate delta t. FIG. 4A illustrates a cross-section of the variably modulated conduit 400 having a plurality of fluid-actuated bladders 402. The plurality of fluid-actuated bladders 402 may be pneumatic or hydraulic, and are configured to increase or decrease in area, depending on the pressure of the fluid in a space 306 therein. Fluid may be supplied to the bladder 402 by a pump, cylinder, or any fluid management system known in the art. The plurality of bladders 402 is therefore made of a compliant material capable of expanding and contracting. In this embodiment, a relatively large conduit 103 is used to contain the flow in a flow area 304 within the conduit 103. The plurality of bladders 402 is disposed approximately equidistantly along an inner diameter 408 of the conduit 103. The size of the plurality of bladders 402 is changeable to displace fluid flow within the flow area 304, effectively expanding to reduce the flow area 304 or contracting to increase the flow area 304. For example, the process fluid in the flow area 304 may have fluid velocity increased by reducing the area of the flow area 304 when the plurality of bladders 402 is increased in size, so to optimize the delta t. This is reflected in FIG. 4B. In a related example, as shown in FIG. 4A, the process fluid in the flow area 304 may have fluid velocity decreased by increasing the area of the flow area 304 by decreasing the size of the plurality of bladders 402, so to optimize the delta t. This approach is advantageous because the control and positioning of the plurality of bladders 402 is simplified.

In an embodiment, the plurality of bladders 402 may be disposed within the conduit 103 independently from each other. In another embodiment, each one of the bladders of the plurality of bladders 402 may be attached to neighboring bladders. One or more of the bladders of the plurality of bladders 402 may or may not be connected to the conduit 103. Furthermore, each one of the bladders of the plurality of bladders 402 may be independently actuatable. Alternatively, each one of the bladders of the plurality of bladders 402 may be in fluid communication with each other via fluid connections 410. In the figures provided, five bladders of the plurality of bladders 402 are shown, and two fluid connections 410 are shown. More or less than five bladders are contemplated, and more or less than two fluid connections are contemplated.

It should be noted that in embodiments where a flow area 304 is disposed within a vibrating conduit 103, that the materials used are sufficiently stiff to impart the transmission of Coriolis forces to the walls of the vibrating conduit 103, such that a delta-t is measurable. Alternatively, or in conjunction with these embodiments, Coriolis vibrations may be measured directly on the flow area 304 and/or associated bladder.

Figure 5A:
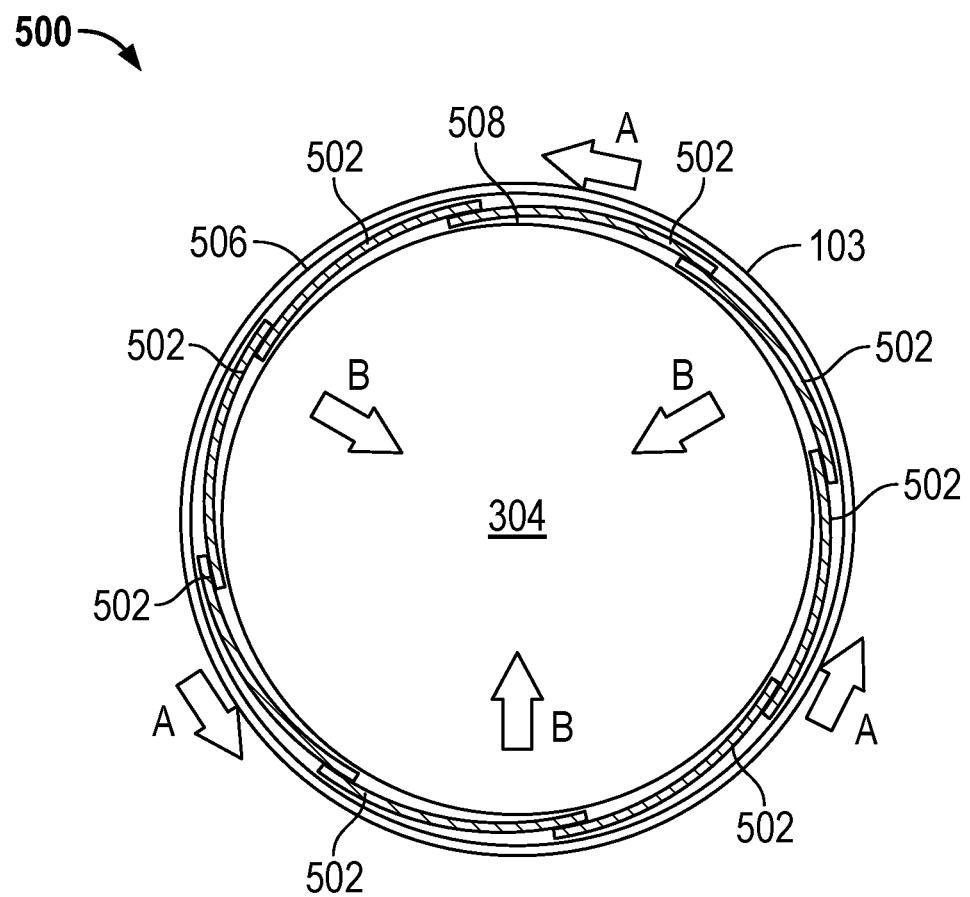
FIGS. 5A and 5B show a variably modulated conduit having sliding leaves according to an embodiment.
Figure 5B:
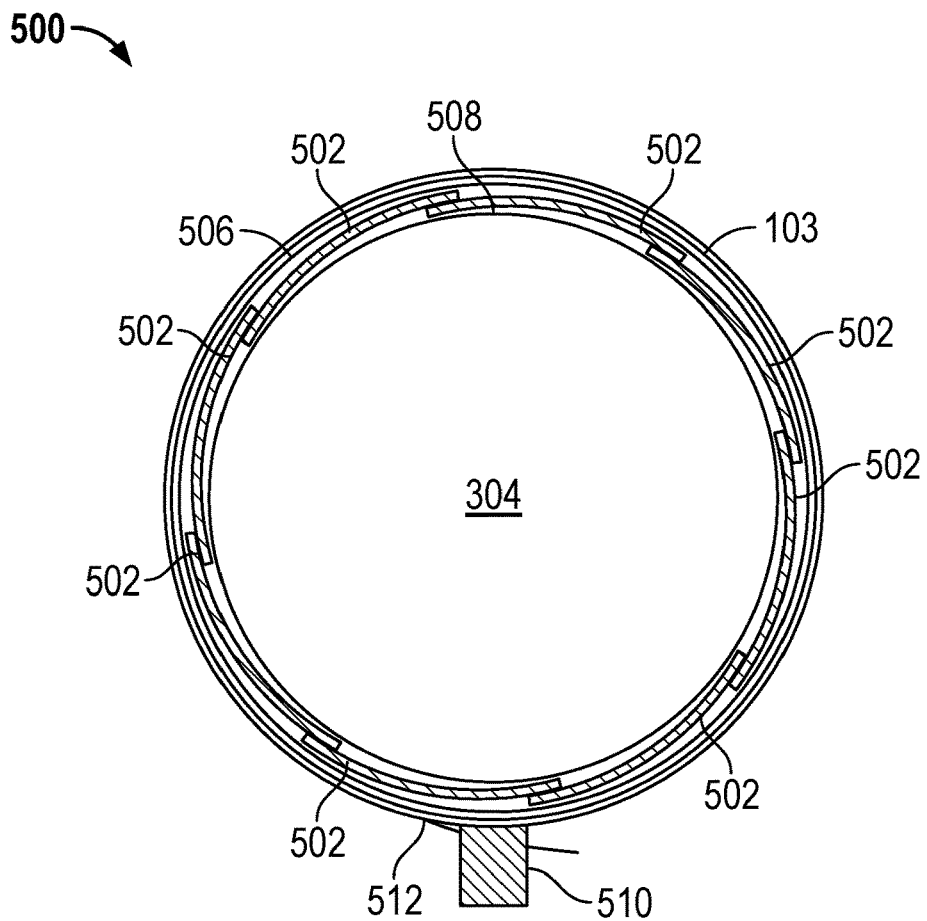

Turning to FIGS. 5A and 5B, a mechanical embodiment of a variably modulated conduit 500 is illustrated. In an embodiment, the conduit 103 is made up of a series of leaves 502 that slide along one another to vary the flow area 304. In an embodiment, the leaves 502 could provide a fluid seal. In a related embodiment, a first 506 and/or second 508 expandable membrane could be used to provide a fluid seal. In FIG. 5A, a first set of arrows (A), indicate motion of the leaves 502 slidingly engaging each other such that the variably modulated conduit 500 is actuated to cause the cross-section of the conduit 103 and as a result, the flow area 304, to decrease in the direction of the second set of arrows (B). The leaves 502 may be substantially parallel to each other, being comprised of curved-rectangular strips. The leaves 502 may alternatively be helically wound to wrap around and define the circumference of the conduit 103. Eight leaves are depicted in the illustrations, but more or less than eight leaves is also contemplated.

In FIG. 5B, an actuator 510 is in mechanical communication with a clamp member 512. The actuator 510 may constrict the clamp member 512 so that the circumference of the clamp member 512 is lessened, in turn causing the leaves 502 to slidingly engage each other as described above, which results in a decreased flow area 304. The flow area is increased when the actuator 510 reduces the pressure of the clamp member 512 on the conduit so that the circumference of the clamp member 512 is increased, in turn causing the leaves 502 to move apart from each other, which results in an increased flow area 304. Meter electronics 20 are in communication with the actuator 510, and control the state of actuation in order to control the flow velocity and delta t separation. A plurality of actuators and clamp members may be utilized along the length of the conduit 103 to provide even actuation forces.

It should be noted that the mechanical embodiment of a variably modulated conduit 500 could be located within a conduit 103, instead of defining the conduit as described above. In this case, the mechanical embodiment of a variably modulated conduit 500 would effectively replace the bladder 302 described in FIGS. 3A and 3B, being disposed in approximately the center of the flow area 304 (again referring to FIGS. 3A and 3B) to displace fluid flow, effectively expanding to reduce the flow area 304 or contracting to increase the flow area 304. For example, the process fluid in the flow area 304 may have fluid velocity increased by reducing the area of the flow area 304 when the bladder 302 is increased in size, so to optimize the delta t. In a related embodiment, the actuator 510 could be disposed on the inside of the variably modulated conduit 500. In this case, the leaves 502 that are biased in a small diameter configuration, and the actuator 510, serve to oppose this bias and expand the circumference of the variably modulated conduit 500 by enlarging the diameter of the clamp member 512.

Figure 6:
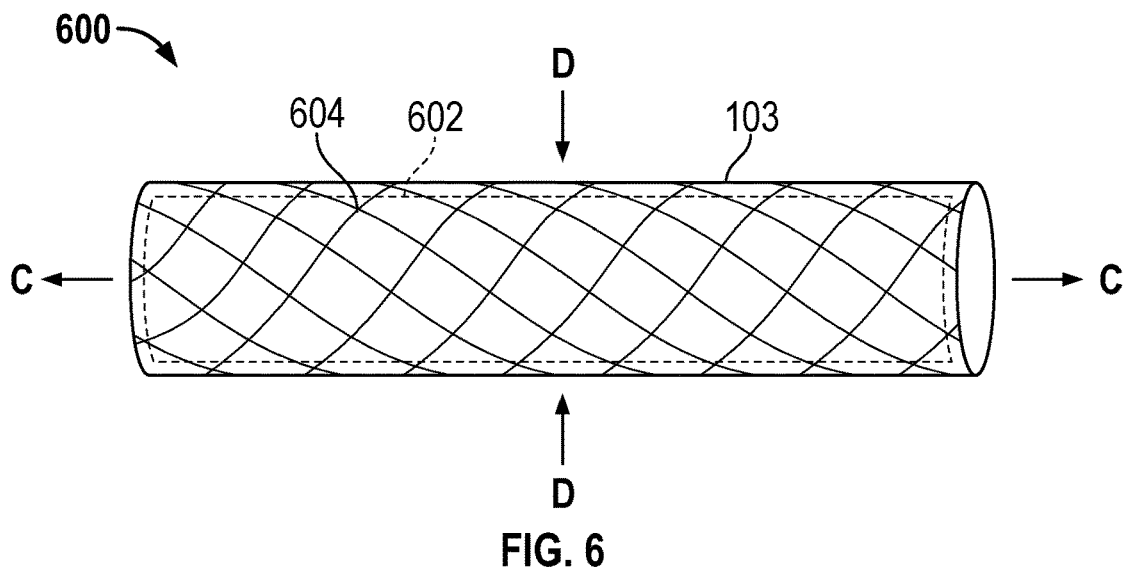
FIG. 6 shows a variably modulated conduit having a helically woven net of fibers according to an embodiment.

Turning to FIG. 6, a mechanical embodiment of a variably modulated conduit 600 is illustrated. In this embodiment, a stretchable membrane 602 contains the fluid flow and a helically woven net of fibers 604 maintains the desired shape of the conduit 103. When the fibers 604 are pulled horizontally away from the ends of the conduit 103 (in the direction of arrows (C)), the straightening of the fibers 604 causes the conduit diameter to reduce, as indicated by arrows (D).

In an embodiment, the inelastic fibers are mechanically pulled to shorten the effective length of the helically woven net of fibers 604 that wrap around the stretchable membrane 602, and thus decreases the diameter of the conduit 103. In an embodiment, an electroactive fiber could be used. In this case, the fiber would shorten or attempt to straighten depending on the type used. For example, without limitation, the use of shape memory alloys (SMA) that transform shape and/or size when heated may be employed.

SMAs are metals that are generally known for their physical transformation above a transformation temperature.

By combining the appropriate alloys, the transformation temperature of an SMA element can be determined and adjusted. The transformation temperature is generally understood as the temperature at which the SMA material starts to transform from a martensite crystal structure to an austenite crystal structure. When the SMA element is below the transformation temperature, the metal remains in the martensite crystal structure. In the martensite crystal structure, the metal can be physically deformed into a first size and/or shape. The metal can remain in that shape while below the transformation temperature. Upon heating the SMA helically woven net of fibers 604 to above the transformation temperature, the fibers 604 transform into the austenite crystal structure where the alloy returns to its "memorized," pre-deformed, size and/or shape, which may be a constricted (smaller diameter form) of the net of fibers 604. This unique property of SMA materials can be utilized to selectively grow or shrink the net of fibers 604 and thus the variably modulated conduit 600. According to an embodiment, the deformation (stretching) of the SMA elements while the SMA elements are below the transformation temperature can be accomplished via a force provided by the stretchable membrane 602. In another embodiment, internal or external biasing members (not shown) may provide the force.

A SMA-actuated variably modulated conduit 600 provides an advantage over a mechanically actuated variably modulated conduit 600, as the need for actuators and complex mounting schemes is reduced or eliminated. Additionally, SMA can typically be manufactured smaller and generally consume less power. However, fluids at a temperature near or above the transformation temperature may provide challenges for an SMA embodiment, as heat from the fluid may not allow the SMA elements to cool below the transformation temperature.

It should be noted that the mechanical embodiment of a variably modulated conduit 600 could be located within a conduit 103, instead of defining the conduit as described above. In this case, the stretchable membrane 602 would not be located on the inner diameter of the helically woven net of fibers 604, but would rather encapsulate it. In this embodiment, the variably modulated conduit 600 would effectively replace the bladder 302 described in FIGS. 3A and 3B, being disposed in approximately the center of the flow area 304 (again referring to FIGS. 3A and 3B) to displace fluid flow, effectively expanding to reduce the flow area 304 or contracting to increase the flow area 304. For example, the process fluid in the flow area 304 may have fluid velocity increased by reducing the area of the flow area 304 when the helically woven net of fibers 604 is increased in diameter, so to optimize the delta t. The fluid velocity may be increased by increasing the area of the flow area 304 when the helically woven net of fibers 604 is decreased in diameter, so to optimize the delta t.

Figure 7:
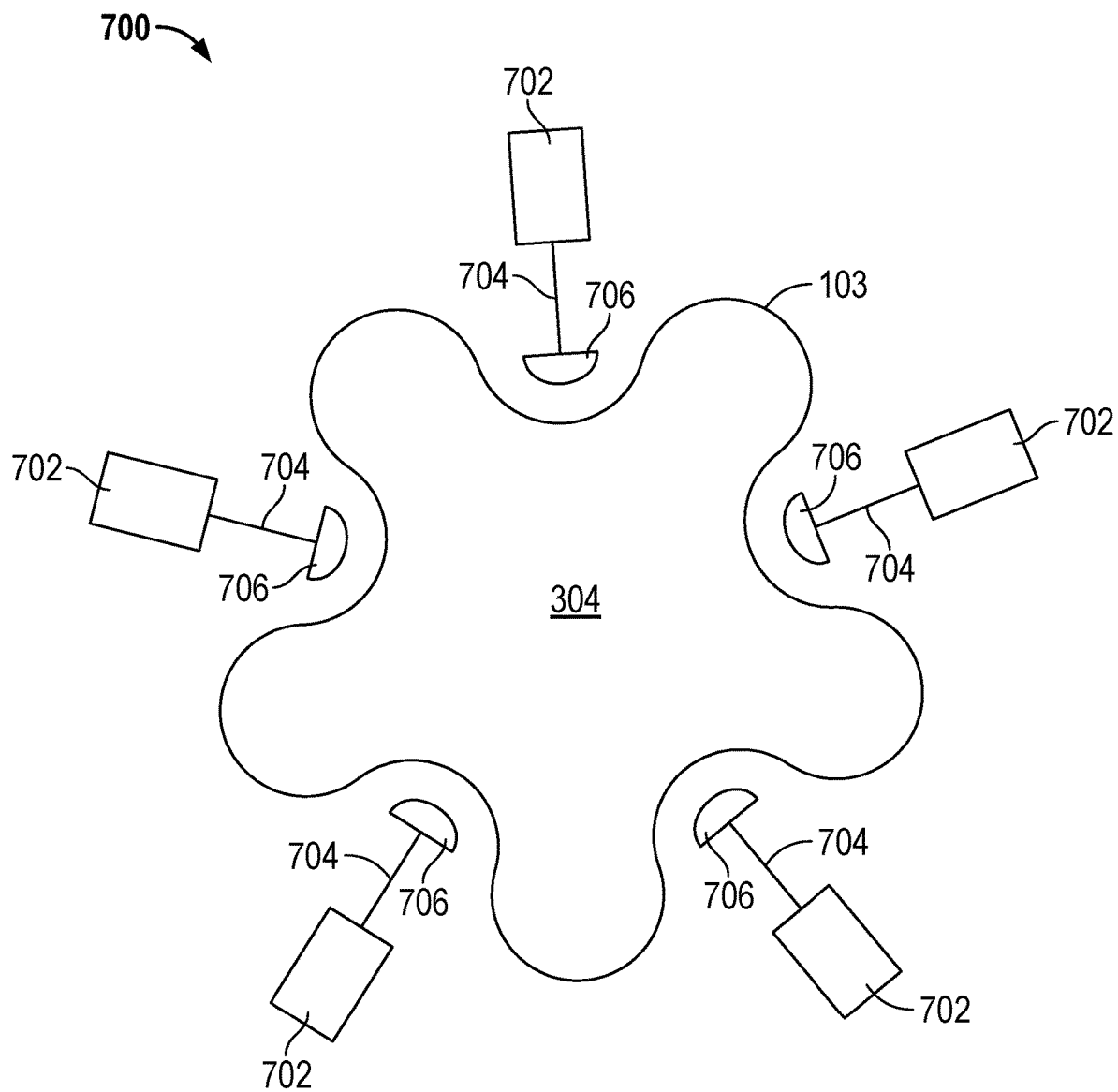
FIG. 7 shows a variably modulated conduit having a resilient material flow tube according to an embodiment.

FIG. 7 illustrates yet another mechanical embodiment of a variably modulated conduit 700. In this embodiment, the conduit 103 is made of a resilient material. The material could comprise a rubber, plastic, polymer, metal, combinations thereof, and any other material known in the art. The area of the conduit 103 is modulated via deforming the shape thereof. Thus, no internal moving parts or separate portions of the sensor assembly 10 to contain fluid flow are required. In an embodiment, a plurality of actuators 702 may change position to deform the conduit 103. In an embodiment, a shaft 704 with each actuator 702 may press a pad 706 towards the conduit 103 to induce a deformation therein. As the actuator 702 moves the shaft 704 and pad 706 towards the conduit 103, the conduit 103 is deformed in such a manner that the flow area 304 is decreased in size. This would cause the process fluid in the flow area 304 to increase in velocity. Likewise, by moving the shaft 704 and pad 706 away from the conduit 103, the process fluid in the flow area 304 would decrease in velocity since the flow area 304 would increase.

In some embodiments, the pad 706 may not be necessary. In some embodiments, the actuator 702 may be directly attached to the conduit 103 such that both push and pull forces are directly transmitted to the conduit 103, thus obviating the need for a material that resiliently springs back to a particular shape when pressure is relieved.

It should be noted that the mechanical embodiment of a variably modulated conduit 700 could be located within a conduit 103, instead of defining the conduit 103 as described above. In this case, the actuators 702 would not be located on the outside of the conduit 103, but would rather be disposed inside the area designated as a flow area 304 in FIG. 8. This tubular structure would be placed inside a conduit 103. In this embodiment, the variably modulated conduit 700 would effectively replace the bladder 302 described in FIGS. 3A and 3B, being disposed in approximately the center of the flow area 304 (again referring to FIGS. 3A and 3B) to displace fluid flow, effectively expanding to reduce the flow area 304 or contracting to increase the flow area 304. For example, the process fluid in the flow area 304 may have fluid velocity increased by reducing the area of the flow area 304 when the actuators 702 cause an increase in diameter of this tubular structure.

Figure 8:
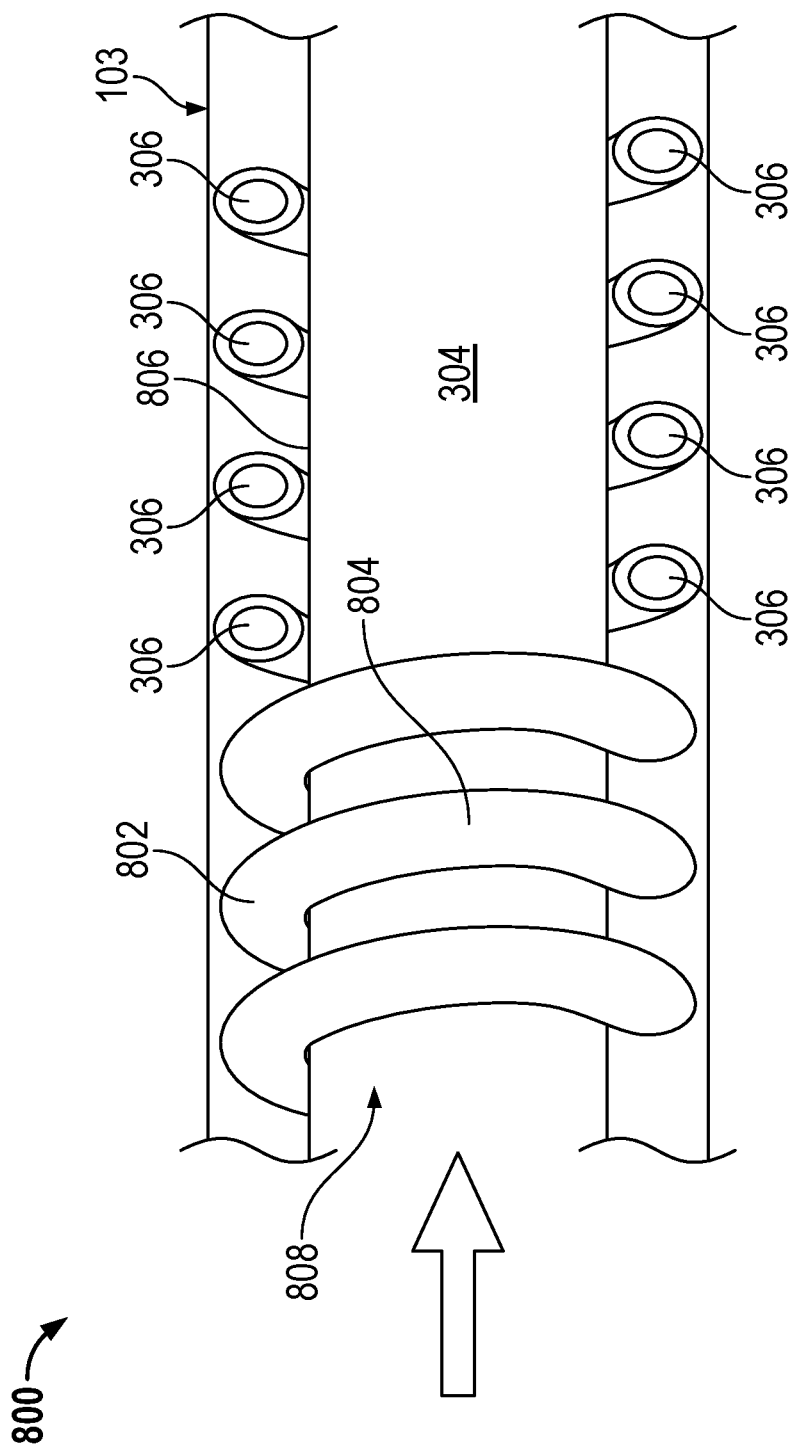
FIG. 8 shows a variably modulated conduit having a bladder according to yet another embodiment.

Turning to FIG. 8, an embodiment of a variably modulated conduit 800 is provided. This embodiment optimizes the flow area 304 of the conduit 103. For example, the flow-path modulation routine 216 may optimize the flow signal by targeting a large delta t. This is accomplished by constricting the flow area 304 of the conduit 103 to maintain enough fluid velocity to create the desired delta t. In another embodiment, the pressure drop across the meter is optimized. This may be done directly using an external differential pressure measurement or by targeting the minimum fluid velocity needed to confidently calculate delta t. FIG. 8 illustrates a cutaway view of the variably modulated conduit 800 having a coiled bladder 802. The coiled bladder 802 may be pneumatic or hydraulic, and is configured to increase or decrease in cross-sectional area, depending on the pressure of the fluid in a space 804 therein. The coiled bladder 802 is therefore made of a compliant material capable of expanding and contracting. In this embodiment, a relatively large conduit 103 is used to contain the coiled bladder 802. A resilient inner membrane 806 is disposed within the coils of the coiled bladder 802, and defines the flow area 304. As pressure in the coiled bladder 802 changes, the coiled bladder 802 increases or decreases in size, thus causing the resilient inner membrane 806 to shift positions. When the pressure in the coiled bladder 802 is increased, the size of the coiled bladder 802 increases, which reduces the core area 808 defined by the coils, which in turn causes the resilient inner membrane 806 to have a smaller cross section, thus reducing the size of the flow area 304. When the pressure in the coiled bladder 802 is decreased, the size of the coiled bladder 802 decreases, which increases the core area 808 defined by the coils, which in turn causes the resilient inner membrane 806 to have a larger cross section, thus reducing the size of the flow area 304. Thus, the process fluid in the flow area 304 may have fluid velocity increased by reducing the area of the flow area 304 when the coiled bladder 802 is increased in size, so to optimize the delta t. In a related example, the process fluid in the flow area 304 may have fluid velocity decreased by increasing the area of the flow area 304 by decreasing the size of the coiled bladder 802, so to optimize the delta t. One advantage to this approach is that little to no change in conduit 103 stiffness occurs as the result of changing pressure in the coiled bladder 802.

Figure 9A:
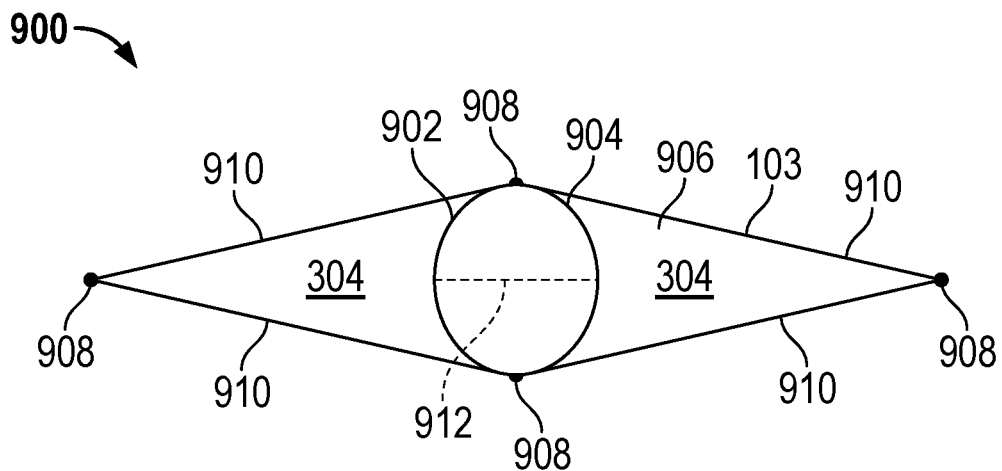
FIGS. 9A and 9B show a variably modulated conduit having a hinged member according to an embodiment.
Figure 9B:
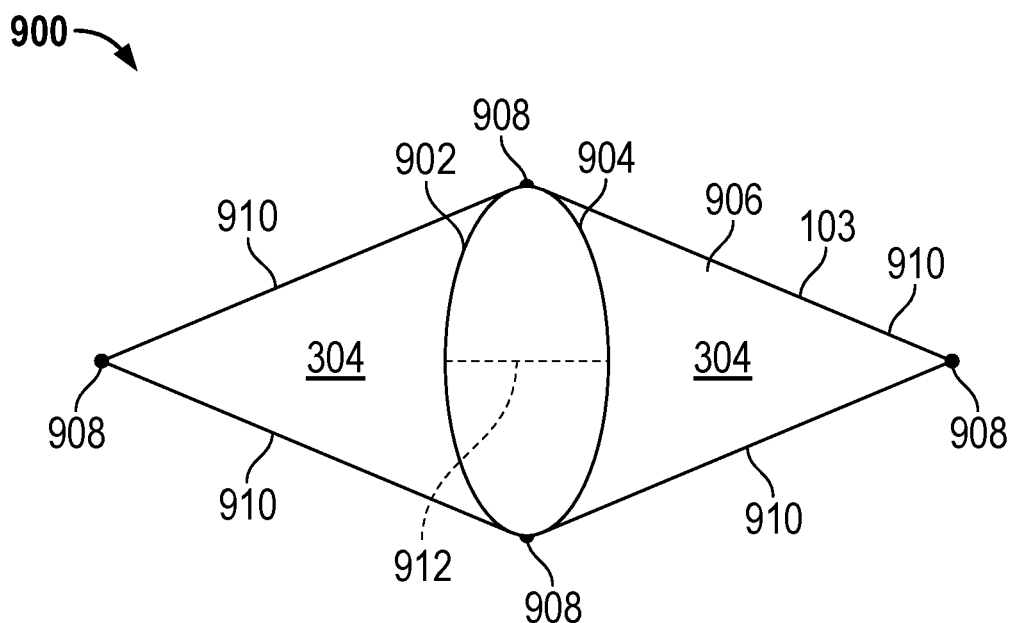

Turning to FIG. 9A and 9B, another embodiment of conduit 103 having a variable cross sectional area is illustrated. In this embodiment, the cross-sectional area of the flow path (flow area 304) of a fully enclosed fluid can be modulated passively by leveraging the dynamic and static pressures of moving and static process fluid. In this context a passive method is defined as one that uses the energy intrinsic to the fluid flow, and allowing the conduit 103 cross section to match the operating conditions without additional energy. In order to allow the flow area 304 to increase with mass flow rate, the static pressure must be decoupled from flowing pressure. The flow area 304 must be unresponsive to total pressure, yet still be sensitive to the differential pressure created by flow. Otherwise, the flow area 304 would change with total pressure instead of flow rate.

To decouple the static and dynamic pressures, a variably modulated conduit 900 is provided that has a cross-section comprised of both flowing and non-flowing areas. For example, in FIGS. 9A and 9B, the flow area 304 is open to process fluid at both inlet and outlet ends. However, a static pressure conduit 902 is provided having only a single end open to process fluid, proximate the inlet, yet is sealed to itself proximate the outlet. This stagnates the fluid in the static pressure conduit 902, which allows the static pressure to be separated from the dynamic pressure. A first pressure sensor 904 may be installed in the static pressure conduit 902, while a second pressure sensor 906 may be installed to measure pressure of a fluid in the flow area 304. It will be obvious that the first pressure sensor 904 measures a static pressure of the process fluid, and the second sensor 906 measures dynamic pressure of the process fluid. When there is flow, a pressure differential ($\Delta P$) generally occurs between the static pressure conduit 902 and the flow area 304.

The static pressure conduit 902 is secured to the conduit 103. The conduit 103 has a plurality of hinged joints 908 that allow the shape of the conduit 103 to change. The static pressure conduit 902 is made of a compliant material that may deform/stretch as the pressure therein increases, thus the cross-sectional area of the static pressure conduit 902 increases as static pressure increases. Since the static pressure conduit 902 is secured to the conduit 103, as the static pressure conduit 902 increases in size, the force required to deform the static pressure conduit 902 is conferred to the conduit 103, and causes the conduit 103 to change shape. The shape change of the conduit 103 is a result of conduit walls 910 pivoting about the hinged joints 908. For example, FIG. 9A illustrates a relatively low static pressure in the static pressure conduit 902, while FIG. 9B illustrates a relatively larger static pressure in the static pressure conduit 902 such that the conduit walls 910 are shifted so that the flow area 304 is increased. Overall, the $\Delta P$ is utilized to mechanically increase the flow area until an equilibrium is reached. It should be noted that while only one geometry is illustrated, many potential geometries could accomplish this goal, not limited to more or less hinged joints 908, more or less conduit walls 910, differing conduit wall 910 shapes, differing static pressure conduit shape, etc. Furthermore, the resiliency and resistance of the material of the static pressure conduit 902 may be optimized based upon an expected flow rate and/or desired turn down. Brace 912 may be provided in embodiments to direct the deformation of the static pressure conduit 902 in a desired direction.

Figure 10A:
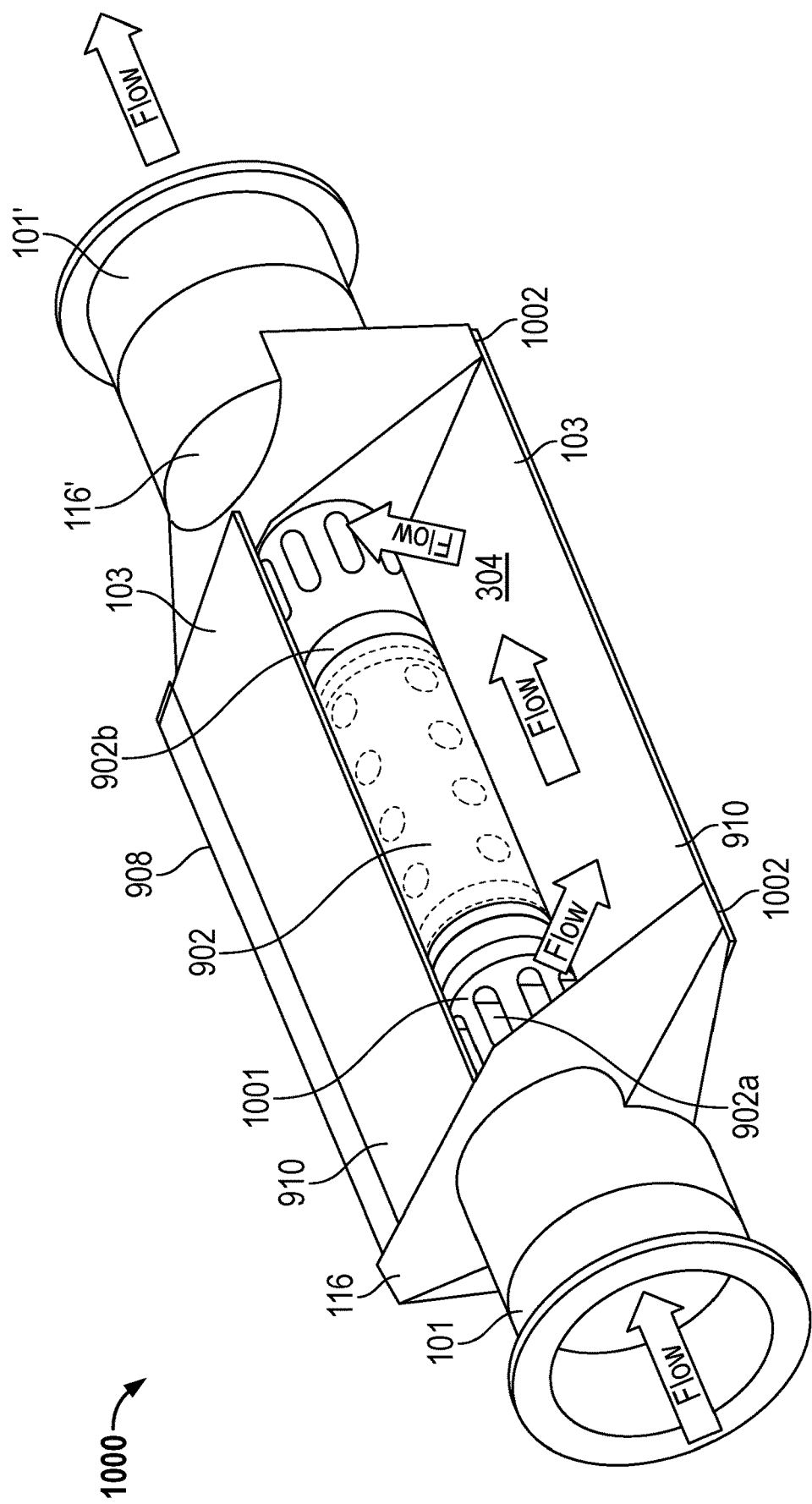
FIGS. 10A and 10B show a flowmeter having a hinged member according to an embodiment.
Figure 10B:
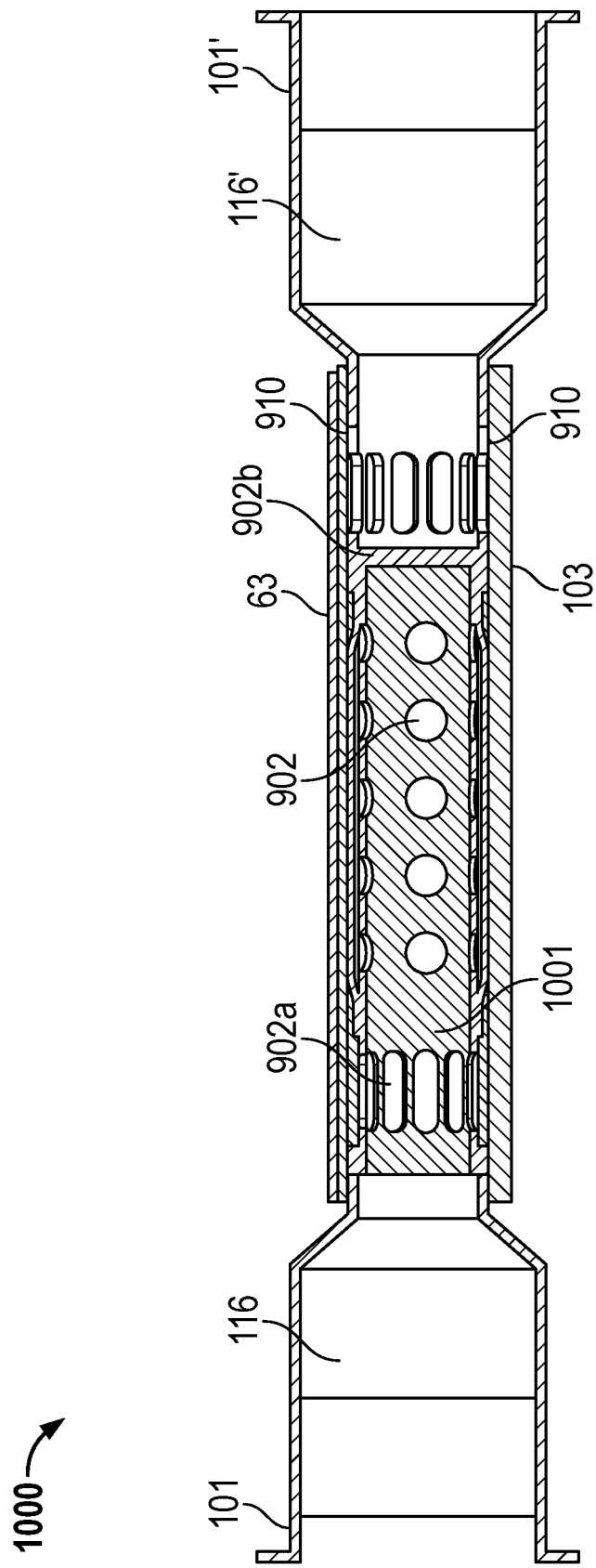

FIGS. 10A and 10B illustrate a related embodiment of the of conduit 103 having a variable cross sectional area that may leverage the dynamic and static pressures of moving and static process fluid. FIG. 10A has a conduit wall 910 removed for clarity. To decouple the static and dynamic pressures, a variably modulated conduit 1000 is provided that has a cross-section comprised of both flowing and non-flowing areas. For example, in FIGS. 10A and 10B, the flow area 304 is open to process fluid at both inlet and outlet ends. However, a static pressure conduit 902 is provided having only a single open end 902A to process fluid, proximate the inlet, yet is sealed to itself on a closed end 902b proximate the outlet. This stagnates the fluid in the static pressure conduit 902, which allows the static pressure to be separated from the dynamic pressure. Pressure sensors may be installed as described in FIGS. 9A and 9B and the accompanying description. When there is flow, a pressure differential ($\Delta P$) generally occurs between the static pressure conduit 902 and the flow area 304.

The static pressure conduit 902 is secured to a spacer tube 1001 and the conduit 103. The conduit 103 has a plurality of hinged joints 908 that allow the shape of the conduit 103 to change. In one embodiment, some of the hinged joints 908 may be anchored to points 1002 on the end caps 116, 116' (i.e. manifolds). The static pressure conduit 902 is made of a compliant material that may deform/stretch as the pressure therein increases, thus the cross-sectional area of the static pressure conduit 902 increases as static pressure increases. At rest, the static pressure conduit 902 maintains the shape of the underlying spacer tube 1001. Since the static pressure conduit 902 is secured to the conduit 103, as the static pressure conduit 902 increases in size, the force required to deform the static pressure conduit 902 is conferred to the conduit 103, and causes the conduit 103 to change shape. The shape change of the conduit 103 is a result of conduit walls 910 pivoting about the hinged joints 908. For example, FIG. 10A illustrates a relatively low static pressure in the static pressure conduit 902. Overall, the $\Delta P$ is utilized to passively mechanically increase the flow area until an equilibrium is reached. It should be noted that while only one geometry is illustrated, many potential geometries could accomplish this goal, not limited to more or less hinged joints 908, more or less conduit walls 910, differing conduit wall 910 shapes, differing static pressure conduit 902 shape, etc. Furthermore, the resiliency and resistance of the material of the static pressure conduit 902 may be optimized based upon an expected flow rate and/or desired turn down.

Figure 11:
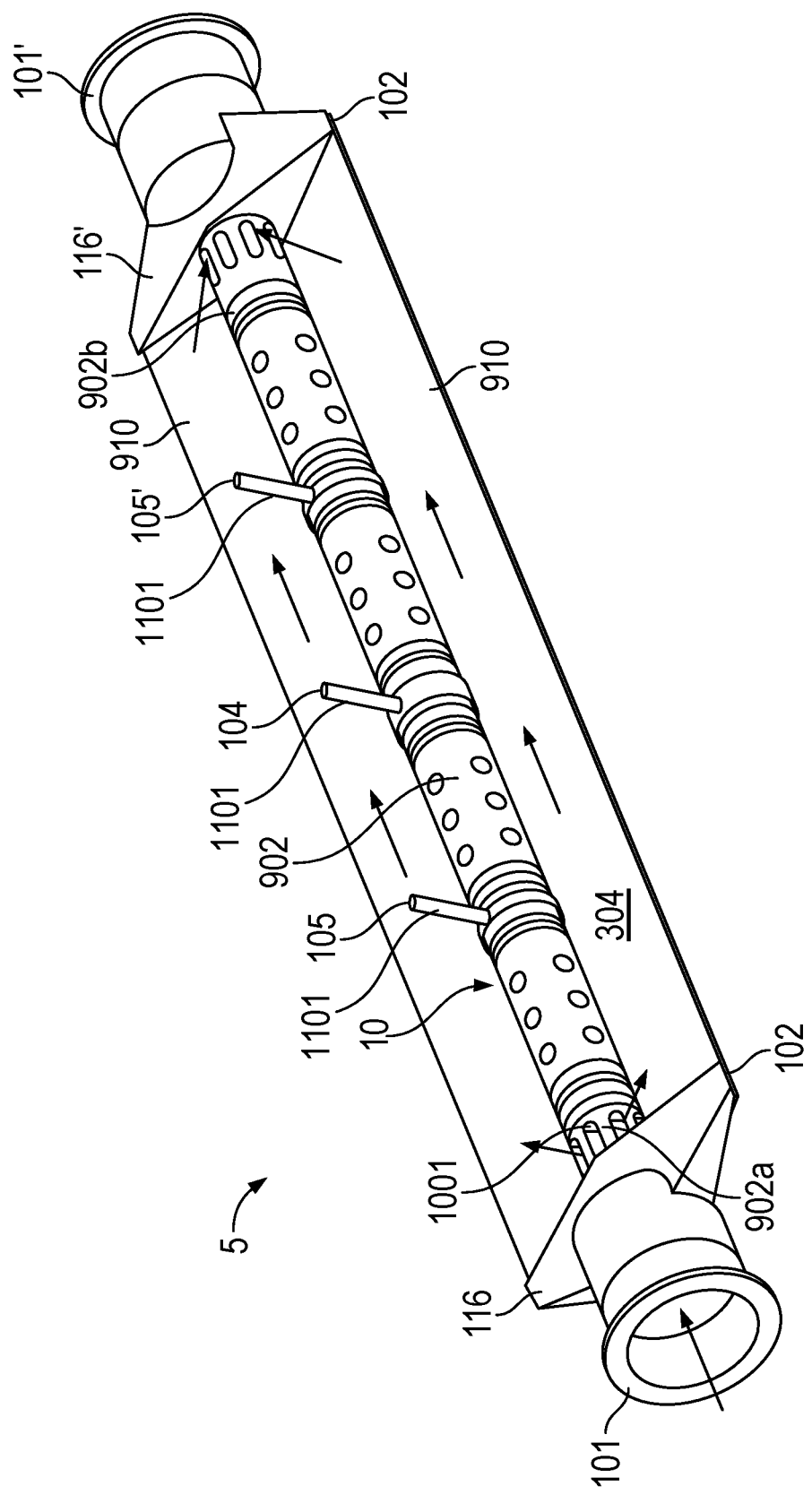
FIG. 11 shows a flowmeter having a hinged member according to another embodiment.

FIG. 11 is an embodiment like that shown in FIGS. 10A-B, but illustrated as a Coriolis flowmeter. The top conduit walls 910 are removed for clarity. Many elements in common with FIG. 1 and the accompanying description are not shown for clarity. This embodiment is configured to measure a characteristic of a flowing material, such as, for example, density, mass flow rate, volume flow rate, totalized mass flow, temperature, and other information.

The sensor assembly 10 includes a pair of flanges 101 and 101' and a conduit 103. The conduit 103 extends outwardly from the flanges 101, 101'. The conduit is made of a plurality of conduit walls 910. When the sensor assembly 10 is inserted into a pipeline system (not shown) which carries a flowing material, the material enters sensor assembly 10 through flange 101, passes into spacer tube 1001, and into conduit 103 and static pressure conduit 902. Passing through conduit 103, the fluid exits the sensor assembly 10 through the flange 101'.

The sensor assembly 10 includes a driver 104. The driver 104 is affixed to conduit 103 in a position where the driver 104 can vibrate the conduit 103 in a drive mode. In the present example, the drive mode is the first out of phase bending mode, and the conduit 103 is selected and appropriately mounted to flanges 101 and 101' so as to provide a balanced system having a relatively predictable and/or constant mass distribution, moment of inertia, and elastic modulus about a longitudinal bending axis. In the present example, where the drive mode is the first out of phase bending mode, the conduit 103 is driven by the driver 104. Those of ordinary skill in the art will appreciate that other drive modes may be used within the scope of the present embodiments.

Like in related embodiments, the static pressure conduit 902 is secured to a spacer tube 1001 and the conduit 103. The conduit 103 has a plurality of hinged joints 908 that allow the shape of the conduit 103 to change. In one embodiment, some of the hinged joints 908 may be anchored to points 1002 on the end caps 116, 116' (i.e. manifolds). The static pressure conduit 902 is made of a compliant material that may deform/stretch as the pressure therein increases, thus the cross-sectional area of the static pressure conduit 902 increases as static pressure increases. At rest, the static pressure conduit 902 maintains the shape of the underlying spacer tube 1001. Since the static pressure conduit 902 is secured to the conduit 103, as the static pressure conduit 902 increases in size, the force required to deform the static pressure conduit 902 is conferred to the conduit 103, and causes the conduit 103 to change shape. The shape change of the conduit 103 is a result of conduit walls 910 pivoting about the hinged joints 908. For example, FIG. 10A illustrates a relatively low static pressure in the static pressure conduit 902. Overall, the ΔP is utilized to passively mechanically increase the flow area until an equilibrium is reached. It should be noted that while only one geometry is illustrated, many potential geometries could accomplish this goal, not limited to more or less hinged joints 908, more or less conduit walls 910, differing conduit wall 910 shapes, differing static pressure conduit 902 shape, etc. Furthermore, the resiliency and resistance of the material of the static pressure conduit 902 may be optimized based upon an expected flow rate and/or desired turn down.

The sensor assembly 10 shown includes a pair of pickoffs 105, 105' that are affixed to conduit 103. In the embodiment depicted, the pickoffs 105, 105' may be attached to studs 1101. The pickoffs 105, 105' may be electromagnetic detectors, for example—pickoff magnets and pickoff coils that produce pickoff signals that represent the velocity and position of the conduit 103. Those of ordinary skill in the art will appreciate that the motion of the conduit 103 is proportional to certain characteristics of the flowing material, for example, the mass flow rate and density of the material flowing through the conduits 103.

The present invention as described above provides various systems and methods related to variably modulated flow conduits. Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating sensors, and not just to the embodiments described above and shown in the accompanying figures. Accordingly, the scope of the invention should be determined from the following claims.

What is claimed is:

1. A flowmeter (5) having a sensor assembly (10) connected to meter electronics (20), wherein the sensor assembly (10) comprises at least one driver (104) and at least one pickoff (105), comprising:
   a variably modulated conduit (300) wherein a majority of a length of the variably modulated conduit within the flowmeter is configured to uniformly change a flow area (304) therein.

2. The flowmeter (5) of claim 1, wherein the flow area (304) is adjustable to maintain a desired fluid velocity of fluid flowing therein.

3. The flowmeter (5) of claim 2, wherein the fluid velocity is maintained at a rate that maintains a desired delta time delay between pickoffs on the conduit.

4. The flowmeter (5) of claim 1, comprising:
   a first pressure sensor for measuring a first fluid pressure in the sensor assembly (10);
   a second pressure sensor for measuring a second fluid pressure in the sensor assembly (10); and
   wherein the flow area (304) is adjustable to maintain a desired differential pressure between the first and second pressure sensors.

5. The flowmeter (5) of claim 1, wherein the variably modulated conduit (300) comprises a fluid-actuated bladder (302) disposed in the flow area (304), wherein the fluid-actuated bladder (302) comprises an adjustable cross-sectional area.

6. The flowmeter (5) of claim 5, comprising at least one support (308) configured to suspend the bladder (302) within the conduit (103).

7. The flowmeter (5) of claim 1, wherein the variably modulated conduit (300) comprises a plurality of fluid-actuated bladders (402) disposed in the flow area (304), wherein the plurality of fluid-actuated bladders (402) are configured to adjust in size to displace fluid flow within the flow area (304).

8. The flowmeter (5) of claim 7, wherein the plurality of fluid-actuated bladders (402) are disposed approximately equidistantly along an inner perimeter of the conduit (408) of the conduit (103).

9. The flowmeter (5) of claim 1, wherein the variably modulated conduit (300) comprises a helically shaped bladder (802) disposed in the flow area (304), wherein the coiled bladder (802) comprises an adjustable cross-sectional area.

10. The flowmeter (5) of claim 5, wherein the fluid-actuated bladder (302), plurality of fluid-actuated bladders (402), or helically shaped bladder (802) comprises a compliant material configured to expand and contract.

11. The flowmeter (5) of claim 5, wherein the fluid-actuated bladder (302), plurality of fluid-actuated bladders (402), or helically shaped bladder (802) receives a fluid in an inner space (306) therein.

12. The flowmeter (5) of claim 9, comprising a resilient inner membrane (806) disposed inside the coils of the helically shaped bladder (802) and defining the flow area (304).

13. The flowmeter (5) of claim 1, wherein the variably modulated conduit (300) comprises a plurality of leaves (502) slidingly engaged to each other to form an adjustable flow area (304).

14. The flowmeter (5) of claim 13, wherein an expandable membrane (506, 508) is disposed proximate the plurality of leaves (502) to provide a fluid-tight seal.

15. The flowmeter (5) of claim 13, wherein the plurality of leaves (502) is actuatable with a clamp member (512) to adjust the diameter of the plurality of leaves (502).

16. The flowmeter (5) of claim 1, wherein the variably modulated conduit (300) comprises:
   a stretchable membrane (602) comprising a helically woven net of fibers (604), wherein the helically woven net of fibers (604) defines the flow area (304).

17. The flowmeter (5) of claim 16, wherein the woven net of fibers (604) is actuatable to adjust the diameter of the flow area (304).

18. The flowmeter (5) of claim 4, comprising an inflatable conduit (902) disposed in the variably modulated conduit (300), wherein the inflatable conduit (902) comprises a first end open to the fluid, and a second end sealed to itself, configured to allow a static pressure to be measured therein and a pressure differential (ΔP) generally to be measured between the inflatable conduit (902) and the flow area (304).

19. The flowmeter (5) of claim 18, wherein the inflatable conduit (902) comprises a compliant material that deform as a pressure therein increases.

20. The flowmeter (5) of claim 18, wherein the variably modulated conduit (300) comprises a plurality of conduit walls (910) pivotable about a plurality of hinged joints (908), and wherein the inflatable conduit (902) is configured to contact the plurality of conduit walls (910) and modulate the flow area (304) by pivoting the plurality of conduit walls (910) about the plurality of hinged joints (908).

21. The flowmeter (5) of claim 18, wherein the inflatable conduit (902) is configured to increase in size until a static pressure therein and a dynamic pressure in the flow area (304) reaches equilibrium.

22. A method of adjusting flow through a flowmeter conduit comprising the steps of:
   providing a sensor assembly; and
   providing a variably modulated conduit in the sensor assembly wherein a majority of a length of the variably modulated conduit is configured to uniformly change a flow area therein and being adjustable to maintain a desired fluid velocity of fluid flowing therein;
   maintaining a fluid velocity at a rate that maintains a desired delta time delay between pickoffs on the conduit.

23. The method of claim 22, comprising the steps of:
   measuring a first fluid pressure in the sensor assembly;
   measuring a second fluid pressure in the sensor assembly; and
   adjusting flow area to maintain a desired differential pressure between the first and second fluid pressures.

24. The method of claim 22, comprising the step of actuating at least one fluid-actuated bladder disposed in the flow area, wherein the at least one fluid-actuated bladder comprises an adjustable cross-sectional area.

25. The method of claim 22, comprising the step of actuating at least one of a plurality of leaves disposed in the flow area to slidingly engage upon each other so to define an adjustable cross-sectional area.

26. The method of claim 22, comprising the steps of:
   providing an inflatable conduit disposed in the variably modulated conduit, comprising a first end open to the fluid, and a second end sealed to itself;
   measuring a static pressure in the static pressure conduit;
   measuring a dynamic pressure in the flow area; and
   calculating a pressure differential (ΔP) between the inflatable conduit and the flow area.

27. The method of claim 26, wherein the inflatable conduit comprises a compliant material that deform as a pressure therein increases.

28. The method of claim 27, comprising the steps of:
   providing a plurality of conduit walls pivotable about a plurality of hinged joints; and
   modulating the flow area by pivoting the plurality of conduit walls about the plurality of hinged joints.

29. The method of claim 27, comprising the steps of:
   placing the plurality of conduit walls in contact with the static pressure conduit;
   adjusting a size of the static pressure conduit due to a static pressure therein; and
   ceasing to adjust the size of the inflatable conduit when an equilibrium between a dynamic pressure in the flow area and a static pressure in the inflatable conduit is reached.

30. The method of claim 22, comprising the steps of:
   determining the flow area of the variably modulated conduit; and
   determining a flow rate of fluid flowing through the variably modulated conduit.

\* \* \* \* \*